Figures 1, 2:
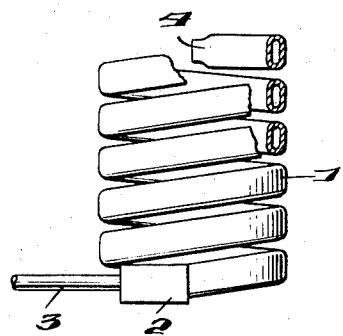

July 8, 1958

A. R. SCHILLING 2,841,866

METHOD OF FORMING THIN-WALLED TUBING
INTO A DESIRED SHAPE

Filed Feb. 10, 1954

| FILL TUBE WITH MATERIAL NORMALLY FLUID AT ROOM TEMPERATURE |
| --- |
| QUICK FREEZE TO SOLIDIFY MATERIAL |
| BEND OR COIL CHILLED TUBE TO DESIRED SHAPE |
| HEAT TREAT TO HARDEN TUBE AND EVAPORATE INTRODUCED MATERIAL |

INVENTOR
A. R. SCHILLING,

BY Taylor, Cifelli & Jurick

ATTORNEYS

United States Patent Office 2,841,866
Patented July 8, 1958

2,841,866

METHOD OF FORMING THIN-WALLED TUBING INTO A DESIRED SHAPE

Arthur R. Schilling, Bound Brook, N. J., assignor, by mesne assignments, to Daystrom, Incorporated, Murray Hill, N. J., a corporation of New Jersey Application February 10, 1954, Serial No. 409,400

2 Claims. (Cl. 29—423)

This invention relates to a method of forming thin-walled tubing into desired shapes and more particularly to a method of making Bourdon tubes or springs.

The Bourdon tubes or springs which are employed in pressure-actuated measuring and control devices are curved pieces of thin-walled metal tubing which tend to uncoil when subjected to internal pressure and which adjust a pointer or control element in accordance with the internal pressure.

To prevent a buckling or collapse of the tubing, during the formation of Bourdon springs from straight tubing, the prior practice has been to fill the straight tubing with a normally solid material such as resin, matrix metal or sand prior to the coiling or bending of the tubing, and to remove the filling material from the shaped spring. This has been a tedious and time consuming operation since a powdered material must be introduced in small quantities which are individually tamped to insure uniformity in the filler substance, while the tubing must be maintained above the melting point of the filler material when resin or matrix metal is employed. After shaping the Bourdon spring, the filler material should be completely removed but this has been a difficult operation, particularly in the case of Bourdon springs which comprise a plurality of convolutions of small diameter tubing. The response characteristics of the springs are affected by any remaining filler material and the quantity production of Bourdon springs with relatively uniform characteristics by the prior methods has been relatively expensive.

The broad object of the present invention is to provide a simple, economical method of forming thin-walled tubing into a desired shape. More specific objects of the present invention are to provide methods of manufacturing Bourdon springs which eliminate the difficulties and expense of the prior methods. Other objects are to provide methods of manufacturing Bourdon springs which comprise the steps of filling a length of straight tubing with a material which is normally fluid at room temperature, solidifying the filler material, bending or coiling the tubing to desired shape, and then heating the shaped tubing to remove the filler material by liquefaction and/or evaporation.

More specifically, an object is to provide a method as above stated in which the filler material is water which can be frozen by placing the filled tube in a box or bath containing Dry Ice.

These and other objects and advantages of the invention will be apparent from the following specification when taken with the accompanying drawing in which:

Figure 1 is a front elevation, with parts in section, of a typical Bourdon spring which may be manufactured by the method of the invention; and Figure 2 is a flow sheet listing the sequence of steps according to the invention.

In Figure 1 of the drawing, the reference numeral 1 identifies a Bourdon spring which comprises a plurality of helical convolutions of a thin-walled tube of substantially elliptical cross-section. In the case of Bourdon springs, the tubing generally is made of beryllium copper although relatively soft metals, such as annealed cold-rolled steel and brass, are often employed in specific applications. The open lower end of the tube is anchored in a hollow block 2 into which air, gas or steam is introduced by a capillary, or pipe, 3, and a pointer or other controlled element, not shown, is secured to the free closed end 4 of the tube by any appropriate means.

The Bourdon spring is formed from an initially straight piece of tubing of the required length for the particular type and size of spring, and the end 4 may, if desired, be closed by compressing and welding, or by welding a stopper into the tubing before the shaping operation.

In accordance with the invention, the initially straight piece of tubing is filled with a material, such as water, which is normally fluid at room temperatures, and this material is then solidified by chilling the tubing and its contents. It is preferable, but not necessary, to employ a vacuum to insure a rapid and complete filling of the straight tubing with the fluid filler material. In such case the open tubing is placed into a suitable chamber and the air evacuated therefrom, after which water is admitted into the chamber to a level above the tubing ends thereby completely filling the tubing. After filling, the ends of the tubing may be closed by removable stoppers or by securing a small piece of rubber or neoprene over the ends of the tubing.

The filler material is solidified, for example by placing the tubing in a box or bath containing Dry Ice, and the tubing may then readily be bent or coiled to the desired shape before the ice melts. Upon melting of the ice, the water may be drained or blown from the formed Bourdon spring, and even the last traces are removed by evaporation in the final step of hardening the spring by heating to a temperature above 212° F.

Other liquids may be employed as the filler material but it is presently preferred to employ water since it is available at substantially no cost and need not be recovered after the Bourdon spring is completed.

Having now described my invention, it will be apparent that the method disclosed is not limited to the formation of Bourdon springs but is of general utility in forming thin-walled tubing into any desired shape.

What I desire to protect by Letters Patent of the United States is set forth in the following claims.

I claim:

1. A method of forming a Bourdon spring which comprises filling a straight piece of tubing with a material which is normally fluid at room temperature, solidifying the filler material, bending the tubing to desired shape while the filler material is in solidified state, and heating the shaped tubing to remove the filler material completely by evaporation and to harden the bent tube.

2. A method as recited in claim 1, wherein water is employed as the filler material.

References Cited in the file of this patent

UNITED STATES PATENTS

| | | |
|---|---|---|
| 886,616 | Long | May 5, 1908 |
| 1,844,108 | Smythe | Feb. 9, 1932 |
| 2,167,215 | Leary | July 25, 1939 |
| 2,366,141 | Alderfer | Dec. 26, 1944 |
| 2,487,257 | Morgan | Nov. 8, 1949 |
| 2,731,713 | Schaefer | Jan. 24, 1956 |